United States Patent

[11] 3,567,854

[72] Inventors Leslie G. Tschantz
Brookfield;
William H. Wesbey, New Berlin, Wis.

[21] Appl. No. 769,963
[22] Filed Oct. 23, 1968
[45] Patented Mar. 2, 1971
[73] Assignee General Electric Company

[54] AUTOMATIC BRIGHTNESS CONTROL FOR X-RAY IMAGE INTENSIFIER SYSTEM
6 Claims, 12 Drawing Figs.

[52] U.S. Cl. .......... 178/6.8, 178/7.2, 250/53, 250/65, 250/71
[51] Int. Cl. .......... H04n 1/38, H04n 7/18
[50] Field of Search .......... 178/7.1, 7.2, 6 (X-Ray), 6.8; 250/53, 58, 65, 71

[56] References Cited

UNITED STATES PATENTS

| | | | |
|---|---|---|---|
| 2,913,582 | 11/1959 | Collins | 250/65 |
| 2,915,582 | 12/1959 | Shapiro | 178/7.2 |
| 3,018,331 | 1/1962 | McConnell | 178/7.1 |
| 3,109,093 | 10/1963 | Arrison | 250/65 |
| 3,126,480 | 3/1964 | Bouwers | 250/65 |
| 3,265,812 | 8/1966 | Essinger | 178/7.2 |
| 3,407,268 | 10/1968 | Sennhenn | 178/7.2 |
| 3,424,901 | 1/1969 | Kok | 250/65 |

*Primary Examiner*—Richard Murray
*Assistant Examiner*—Joseph A. Orsino, Jr.
*Attorneys*—Ralph G. Hohenfeldt, Melvin M. Goldenberg, Frank L. Neuhauser and Oscar B. Waddell

ABSTRACT: The visual image in x-ray image intensifier is viewed with a TV camera and displayed on a monitor. Constant picture brightness is maintained regardless of x-ray transparency differences in various regions of the subject by peak detecting the video signals corresponding with a specific picture region and using the signals in a closed-loop system to control the x-ray tube current and, hence, the intensity of the x-ray through the subject.

Inventors
Leslie G. Tschantz
William H. Wesbey
By Ralph G. Hohenfeldt
Attorney

Inventors
Leslie G. Tschantz
William H. Wesbey
By Ralph G. Hohenfeldt
Attorney

AUTOMATIC BRIGHTNESS CONTROL FOR X-RAY IMAGE INTENSIFIER SYSTEM

BACKGROUND OF THE INVENTION

When an X-ray image intensifier passes over regions of different X-ray transparency in the subject, the brightness of the optical image on the output phosphor of the intensifier varies correspondingly. It is, therefore, desirable to use lower x-ray intensity when examining a highly transparent region such as the lungs and to use higher intensity when examining a less transparent region, such as the gastrointestinal tract. Unless x-ray intensity is varied, the optical image may be too bright or too dim, in whole or in part, for comfortable viewing. An image that is too bright i. usually indicative of the subject being exposed to more radiation than is necessary to make a proper examination and diagnosis.

It is common practice to view the optical image with a TV camera and display the image on a monitor. Several schemes have been devised for there systems to maintain constant picture brightness. One scheme interposes an x-ray sensor between the subject and the intensifier and uses the signals from the sensor to control the output from the x-ray tube. The problem with this method is that it controls intensity according to the average picture brightness so some picture areas may be too bright and others may be too dim. Another method is to sample the brightness of a small region of the picture on the output phosphor of the intensifier and develop an error signal which is used to control x-ray tube intensity. This method involves locating a small mirror in the output image beam and directs a beam portion to a light detector which produces the tube current control signals. Among its disadvantages are that it is not easy to select the location and size of the image that is to be sampled for brightness and it results in some light loss due to the mirror being in the optical path between the phosphor and the TV camera.

The present invention overcomes the above-mentioned and other disadvantages.

SUMMARY OF THE INVENTION

According to the present invention, the brightness of the picture on the TV monitor is held constant by varying the power to the filament of the x-ray tube. This varies the x-ray tube filament's electron emissivity and the x-ray output. The new system involves detecting the video signal peaks that correspond with the peak brightness zones within a small rectangular window area of the picture generated by the TV camera. The detected peak signals are compared substantially instantaneously with a reference signal and an error signal is produced. The error signal is used to shift the triggering point of a unijunction transistor oscillator that is synchronized with the AC power supply which supplies the X-ray tube filament. The x-ray tube filament circuit includes a silicon-controlled rectifier whose conduction angle is controlled by the phase relationship between the trigger signals and the AC supply voltage for the filament. Variations in the conducting angle lead to variations in the power to the filament which in turn cause x-ray intensity variations that compensate for X-ray transparency differences.

The invention summarized above results in achievement of several important objects including providing an automatic brightness control which responds to brightness peaks within a sampled area of the picture. This means, for instance, that if there are bright regions on the outside of the image due to the x-ray beam not being collimated sufficiently, such bright regions will not affect the brightness of the image of interest because they will be neglected by the peak detector. On the other hand, if the peak brightness of the brightest zone within the sampled area is not at the maximum permitted brightness level, the system operates to raise the brightness of the zones of this level and raises the relative brightness of the rest of the picture correspondingly. The system is also adapted to permit switching from peak brightness detection to average brightness detection in order to prevent reduction in total x-ray intensity if a small area of very high brightness is under examination.

Another object of the invention is to maintain picture brightness constant by wholly automatic electronic means that require no attention on the part of the operator which would distract from concentrating on the examination and diagnosis as the intensifier is scanned over the subject.

Still another important object is to provide an automatic brightness control system that optimizes the amount of information that can be derived from the x-ray picture for minimum x-ray dosage to the patient.

A more general object is to provide a simple, reliable and easy to operate automatic brightness control for x-ray fluoroscopic systems that use x-ray image intensifiers and display the image on an x-ray monitor.

How the foregoing and other more specific objects are achieved will appear from time-to-time in the ensuing description of a preferred embodiment of the invention taken in conjunction with the drawings.

DESCRIPTION OF A PREFERRED EMBODIMENT

Figure 1:
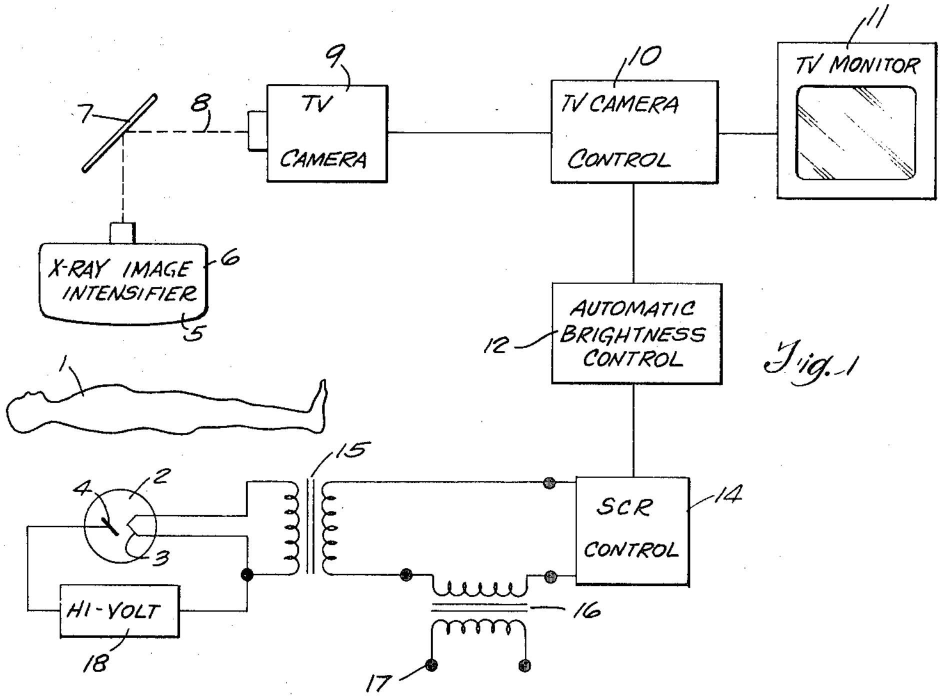
FIG. 1 is a block diagram of an x-ray viewing system that incorporates the invention.

In FIG. 1 the subject of an x-ray examination is designated by the reference numeral 1. The subject may be supported on an examination table, not shown, under which there is an x-ray tube 2 having one or more cathodes such as filament 3 and a target 4. A conventional high voltage supply for the x-ray tube is shown in block form and is marked 18. The x-ray beam from the target projects through the subject and enters the input face 5 of a well-known type of x-ray image converter or intensifier 6. This device converts the x-ray image to a bright optical image of reduced size. The optical image is projected toward a mirror 7 along an axis indicated by the dashed line 8 to the lens of a TV or video camera 9. The camera is coupled in the usual manner with a control 10. The composite video signal from camera control 10 is furnished to a TV monitor 11 which is conventional. With this system it is possible to view on monitor 11 the optical version of an x-ray image that is formed by differential attenuation of the x-ray beam that penetrates the anatomy of the subject 1.

In the system thus far described, it is evident that if the image intensifier 6 is scanned over subject 1, regions of different x-ray transparency will be encountered. If the beam intensity from x-ray tube 2 is held constant under these circumstances, the transparency differences will result in images on monitor 11 which may be too dark in some cases and too bright in others for deriving maximum information and for comfortable viewing. Body conditions will also be encountered where part of the image is too bright and part too dark. The solution proposed by the present invention is to detect the brightness peaks in a sample area of the picture produced by the TV camera and use a signal so produced to adjust the heating current to filament 3 in the x-ray tube so that the X-ray intensity will be regulated in a manner that results in the picture of proper overall brightness.

Figure 3:
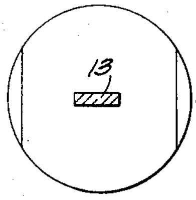
FIG. 3 shows an image on the circular output phosphor of an image intensifier and indicates the control area which is peak detected.

In FIG. 1, according to the invention, the video signals, before being subjected to gain control, are furnished to an automatic brightness control marked with a reference numeral 12. The automatic brightness control is adapted to permit peak detecting the video signals in a window area or a small rectangular area such as 13 in FIG. 3 which window is of adjustable size and preferably located near the center of the circular image which appears on the phosphor. The peak detected signals are compared with a reference signal and an error signal is produced which control the conductivity of a silicon-controlled rectifier control 14. In other words, control 14 determines the conduction angle or part of each half-cycle of the 60 cycle waveform of an AC power supply which is to be applied to filament transformer 15. As can be inferred from FIG. 1 SCR control 14 acts as a switch in the secondary winding of the filament supply transformer 16 which is energized from the AC power line 17.

Figure 2:
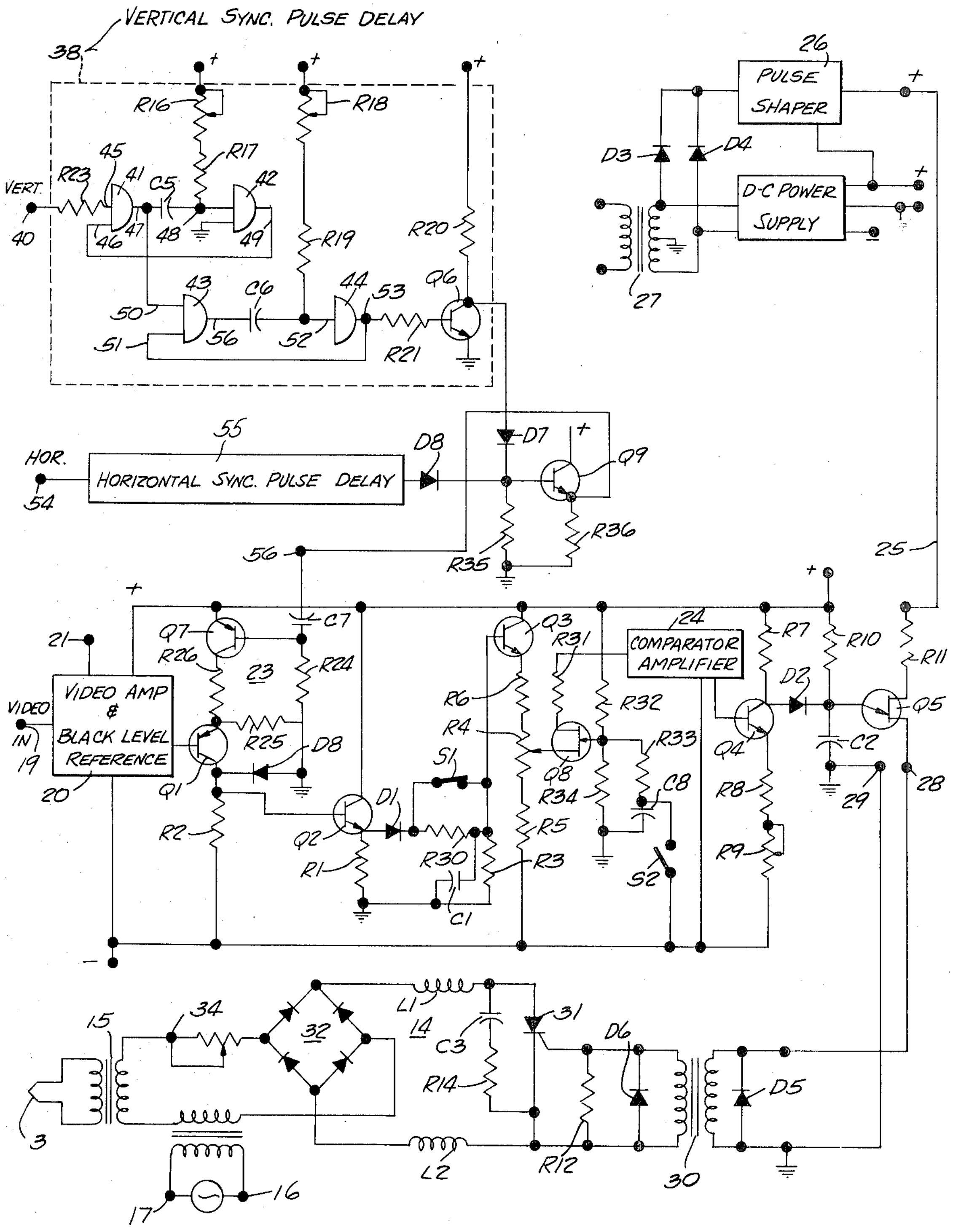
FIG. 2 is a schematic circuit diagram showing the essential features of an automatic brightness control system in accordance with the invention.

A more detailed description of automatic brightness control 12 and SCR control 14 will now be set forth in reference to FIG. 2 which shows their principal features.

In the left central part of FIG. 2 there is a terminal 19 that is supplied with the composite video signal from camera control 10. The video signal is admitted to a conventional video amplifier 20 which has a fixed black level reference. The synchronizing and blanking portions of the video signal are also introduced into the amplifier on a terminal 21 for the purpose of cancelling their counterparts in the video signal which is furnished to input terminal 19. The amplified video signal, referenced to a definite black level, comes out of amplifier 20 and is applied to the base of a transistor Q1. Of course, it is only the video signals lying within the window area that are peak detected according to the invention. Therefore, as will be explained in more detail later, Q1 only conducts when the readout electron beam in the video camera is within the window region at which time appropriate gating signals are applied to terminal 56 to turn Q1 on and off.

When Q1 is turned on as the window area is being scanned, video signals from this limited area are taken from the collector of Q1 and applied to the base of a transistor Q2 which is connected in an emitter-follower configuration and has a resistor R1 in its emitter-to-ground circuit. Due to a resistor R2 and a network 23 the bias on Q2 is so controlled that it conducts only peak video signals of a certain amplitude. These positive-going video signals, corresponding with peak brightness, forward-bias a diode D1 and are integrated instantaneously on a capacitor C1. The capacitor is shunted by a discharge resistor R3. The time constant of the R3 and C1 combination is about 16 milliseconds which corresponds with the elapsed time of two rectified half-cycles of the AC power line or a full AC cycle.

Normally, the video signal peaks on capacitor C1 are used to control image brightness by effecting a change in the x-ray tube filament current and, hence a change in X-ray output from the tube. Response is essentially instantaneous. However, there are occasions when the radiologist prefers to have dark areas around bright areas receive more radiation to enhance visualization of the dark or less transparent areas. For instance, a hole or fine fracture line in bone would appear bright and, if only the brightest peak signals were detected, the radiation level would decrease automatically so that it would be difficult to derive information from surrounding relatively dark areas. Therefore, an operator controlled switch S1 is provided. When S1 is open, peak video signals pass through R30 which is then in series with C1. Under this condition the peak video signals are averaged over a short time constant. Averaging the peaks decreases the peak voltage on C1. This results in increased radiation output from the x-ray tube so that less transparent areas receive more radiation and can be visualized better.

The peak voltage developed on C1 during either peak detection or averaging is applied to the base of a transistor Q3 to permit comparison with a reference voltage that appears on the arm of a potentiometer R4 which is in series with emitter resistors R5 and R6. The voltage difference between the voltages on C1 and the arm of R4 results in an error signal which is furnished to a comparator amplifier 24 through R31 and a field effect transistor Q8 which will be discussed in the next paragraph. The comparator amplifier 24 may take many forms which are known to those versed in the art and, therefore, need not be explained in detail. The amplified output error signal is supplied to the base of a transistor Q4 whose conductivity is controlled by the magnitude of the error signal. Thus, the error signal depends on the voltage on capacitor C1 and this voltage is proportional to the peak video signals in the window area. As the peak video signals increase when bright picture zones are detected, the capacitor voltage increases and turns on transistor Q4 harder. When the brightest zones or peaks in the window area are below a predetermined level, capacitor C1 voltage decreases and transistor Q4 becomes less conductive.

Field effect transistor Q8 is adapted to conduct error signal to comparator 24 only during fluoroscopy and to hold the latest error signal between fluoroscopic exposures. The reason is that it is desirable to have the x-ray tube output be the same when the operator switches back to fluoroscopy. This means that the filament of the x-ray tubes must be held at a constant current and temperature between fluoroscopic exposures. Thus, Q8 is turned off normally by applying to its gate terminal a small positive voltage derived at the top of R34 in the voltage divider comprising R34 in series with R32. During fluoroscopy, however, when it is desired to let peak video error signal control brightness, Q8 is turned on by applying a negative voltage to its gate through R33 and closure of a switch S2 which connects the bottom end of R33 to negative line. Capacitor C8 absorbs any transient signal which may result from closure of S2. Such transient would otherwise alter the error signal when S2 is opened or closed. S2 may be built into the conventional fluoroscopic control foot switch assembly, not shown, so that it may be operated without any special attention on the part of the radiologist.

The series circuit which includes collector resistor resistor R7, Q4, R8 and potentiometer R9 constitutes a shunting circuit for a capacitor C2. This capacitor is in the emitter circuit of a unijunction transistor Q5. C2 has two charging paths. One is from positive line through high resistor R10 and the other is from line through R7 and D2. The capacitor is charged until the peak point of the unijunction transistor Q4 is reached at which time the latter will conduct. If the peak video signal increases such as to make Q4 more conductive, then current which would normally charge C2 through R7 and diode D2 is diverted and C2 charges at a relatively lower rate through R10. If peak video signal on C1 decreases, Q4 becomes less conductive and more of the current through R7 goes through D2 to charge C2 more rapidly.

Unijunction transistor Q5 is synchronized with the AC power line that supplies the x-ray tube filament. Synchronization is obtained by applying full wave rectified square-shaped pulses to the base 2 terminal of Q5 through resistor R11. The square wave pulses come from a pulse shaper 26 over line 25. How these pulses are produced will be discussed later. An increasing video signal shunts more current through transistor Q4 and causes C2 to charge more slowly. This results in unijunction transistor Q5 firing later in each half-cycle, or in other words, later in the duration of each square wave pulse. When peak video signal decreases, less current is shunted through Q4 and more is diverted to R7 and D2 to charge C2 more rapidly. This results in Q5 firing earlier during each half-cycle or square wave pulse. Thus, the firing point of the unijunction transistor can be shifted to any point within each half AC cycle.

Figure 7:

The synchronizing signals for unijunction transistor Q5 are supplied over a conductor 25 from a pulse shaper 26. The pulse shaper is supplied with full wave rectified AC through a pair of diodes D3 and D4 which are connected to the secondary terminals of a power supply transformer 27. The pulse shaper output signals are represented by the square-wave signals in FIG. 8 which correspond with half-cycles of the rectified AC wave which appears above it in FIG. 7. The duration of each square-wave is about 8 milliseconds and the time between them is about 0.5 milliseconds. Between square-wave pulses the voltage on base 2 of unijunction transistor Q5 is reduced to zero in which case the emitter-to-base 1 circuit becomes forward-biased and discharges any residual charge on capacitor C2. This results in capacitor C2 being recharged from the same level during each half-cycle. It was pointed out earlier that the time constant of peak detecting capacitor C1 and resistor R3 was about 16 milliseconds or equal to about two half-cycles of AC. The purpose of this is to have output pulses or spikes appear on base 1 terminal 28 of Q5 at the same time in two consecutive half-cycles. This results in symmetrical conduction during two half-cycles in the filament transformer which is controlled by an SCR that is in turn controlled by the spikes or triggering signals from Q5.

The SCR control for X-ray tube filament 3 is shown in the lower portion of FIG. 2. The triggering pulses from the unijunction transistor Q5 are supplied from terminals 28 and 29 to a transformer 30 whose primary is bridged by a diode D5. The secondary of transformer 30 is bridged by a diode D6 and a resistor R12 across which the input trigger spikes from the unijunction develop a corresponding stepped-up voltage. The spikes are applied between the trigger and cathode electrodes of a silicon-controlled rectifier 31. SCR 31 is bridged by a capacitor C3 in series with a resistor R14 which performs the usual function of absorbing current when the SCR turns off sharply. As explained earlier, the voltage spikes from Q5 occur earlier or later in each half-cycle depending on the peak voltage on capacitor C1. This controls the conduction angle of SCR 31 and correspondingly the amount of power that is delivered to filament 3 through isolating transformer 15.

The anode and cathode of SCR 31 are respectively connected through inductances L1 and L2 to opposite corners of a full wave rectifying bridge 32. The other corners of bridge 32 are connected in a series circuit including a power input transformer 17 whose primary is connected to the AC source, a current control variable resistor 34 and the primary of filament isolating transformer 15. Thus, when SCR 31 turns on, as a unijunction spike occurs, current of one polarity is delivered to the primary of transformer 15 for the remainder of the conduction cycle. During the next half-cycle, when the next spike occurs, current of the opposite polarity is delivered to transformer 15 for conduction cycle of a similar duration. Making the two conductive half-cycles equal prevents magnetic imbalance and saturation of the transformer 15 and 16 cores.

Figure 8:
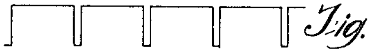
FIGS. 4—12 show waveforms that are useful in connection with explaining operation of the invention.
Figures 9, 10:
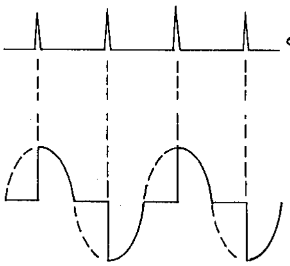
Figure 4:
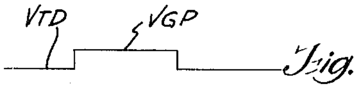
Figure 5:
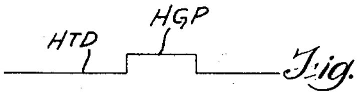
Figures 11, 12:
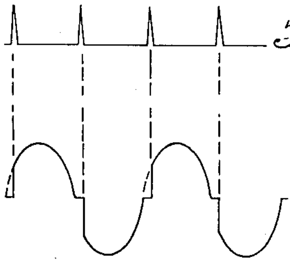
Figure 6:
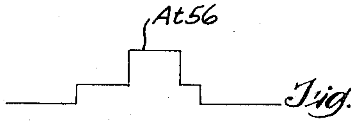

FIG. 8 shows the square-wave synchronizing pulses applied to unijunction transistor Q5 from pulse shaper 26. FIG. 9 is one example of the voltage spikes that are produced on terminal 28 of unijunction transistor Q5. The consecutive spikes in FIG. 9 occur in the same phase relationship with corresponding square-waves in FIG. 8. The conduction angle of the SCR for consecutive half-cycles when the spikes occur where they do in FIG. 9, is shown in FIG. 10. In FIG. 11 it is seen that the spikes have occurred earlier in the half-cycle periods represented by the square wave pulses in FIG. 8. Earlier spikes result from lower peak video signals and result in a conduction angle for SCR 31 that is greater than in the former example as can be seen in FIG. 12. The greater condition angle results in more power to x-ray tube filament 3 and brings the video peaks up to a desired level and the monitor 11 picture up to the desired brightness.

The method of establishing the window area in which peak video signals are detected will now be described in reference to FIG. 2 and FIGS. 4—6. Basically, this involves turning on transistor Q1 for the duration of the window area period so that this transistor can pass video signals to peak detecting transistor Q2.

Control of Q1 is obtained by generation of appropriate gating signals using a vertical sync pulse delay device encompassed by the dashed line rectangle 38 and a horizontal sync pulse delay 55 which is shown in block form because these devices are similar. The essence of this system is to produce a time delay that corresponds with the readout beam in the TV camera sweeping from the top of its screen to the top of the window area after which a suitable output control pulse is produced. Similarly, a delay is produced after each horizontal sync pulse signal. This delay extends from the beginning of the horizontal sweep to the first edge of the window. A control pulse is then produced followed by the absence of a control pulse which defines the second vertical edge of the window. The two control pulses are added and used to gate transistor Q1.

Each positive-going vertical sync pulse is applied to terminal 40 of vertical sync pulse delay 38. The delay comprises four integrated circuit logic devices which are essentially one-shot multivibrators, flip-flops, or NAND gates 41, 42, 43, and 44. The positive input pulse from terminal 40 to terminal 45 of gate 41 causes its output terminal voltage to go down. Then capacitor C5 charges through potentiometer R16 and series resistor R17. R16 is adjustable to govern the C5 charging time and, hence, the place in the scan where the top of the window occurs. The charging period of C5 is equal to the time delay for the vertical sweep. The time delay period is marked VTD in FIG. 4. After C5 is charged, point 49 of gate 42 rises to a higher voltage. This voltage rise is applied to terminal 46 of gate 41 to turn it off. Thus, there is a time delay and a reset.

When C5 is charging, the potential on input terminal 50 of gate 43 is low and the potential on its output terminal 56 is high, preventing C6 from charging, After C5 charges, these potentials are reversed; the potential at point 56 goes low and C6 charges. The charging period of C6 is governed by potentiometer R18 and resistor R19 through which the capacitor charges from the positive supply. R18 sets the line where the bottom of the window occurs. During the charging period for C6, the potential on input terminal 52 of gate 44 is low and its output terminal 53 is high. This potential is applied through R21 to the base of transistor Q6 forward-biasing it. Conduction of Q6 causes a gate pulse to be conducted through diode D7. This positive vertical gate pulse is marked VGP in FIG. 4. When the threshold of gate 44 is reached by charging of C6, the output potential at point 53 falls and resets gate 43 through its input terminal 51. Q6 also turns off.

The horizontal sync pulse delay and gate pulse generator 55 uses similar integrated circuit logic to produce a delay and gate pulse following occurrence of each horizontal sync pulse. The horizontal sync pulses are derived from the TV camera control 10. The latter pulses are applied to horizontal delay input terminal 54 when each horizontal sweep in the TV camera is initiated. A delayed output pulse is delivered through diode D8. The horizontal sweep time delay and the horizontal gate pulse are respectively marked HTD and HGP in FIG. 5. The horizontal and vertical delayed gate pulses are summed to produce the composite gate pulse shown in FIG. 6. Summation occurs on the biasing resistor R35 of transistor Q9. The output voltage appears across emitter resistor R36. This output voltage or composite gate pulse appears at the emitter of Q9 and terminal 56 as shown. The flat top or highest amplitude period of this composite pulse is used for a purpose explained in the next paragraph.

When the combined vertical and horizontal gate pulse at terminal 56 has the desired amplitude, capacitor C7, in peak detector input network 23, charges through R24 and forward-biases transistor Q7 through R25 and R26. This puts a forward-bias on the emitter of Q1 and renders it conductive. During the conductive period of Q1, video signals are transmitted from the video amplifier 20 through Q1 into the base of peak detector transistor Q2. The video signals then pass through D1 if they are of sufficient amplitude and are peak detected on capacitor C1 as described above. Thus, it is seen that peak video signals are detected only in the window area of the picture.

Changing the time delay or pulse width of either or both the vertical sync pulse delay and horizontal sync pulse delay permits changing the window size and position of the window area with respect to the picture.

An important feature of the invention is that the X-ray image on the intensifier can be shuttered down to a small area and yet the brightness of the small image appearing on the monitor will remain constant as compared with a full sized image. This is due to detecting only peak brightness zones in the window area in which the small image may fall in whole or in part. Radiologists often adjust the x-ray tube shutters to look at a small area only. Prior automatic brightness control systems, that sense average brightness of the whole image instead of peak brightness in a window area, would respond to a smaller or shuttered image as it would to an image of lower brightness by turning up the radiation to a preset average brightness. This means that the patient got more radiation through the smaller area instead of less or a constant amount as with the present invention. Thus, conventional shutter compensation can be eliminated with the new peak brightness detection system.

In summary, a system for automatically controlling the brightness of a converted x-ray image has been described. It involves detecting the brightness zones in a sample area of the image by detecting the video peak that corresponds with these zones. The peak value is compared instantaneously with a reference voltage and the resulting error signal is used in a closed loop system to raise or lower x-ray intensity so that maximum or peak brightness is never greater than required for getting the greatest amount of diagnostic information from the image. Other areas of the image have proportionately reduced brightness. Hence, total radiation dosage to the subject is minimized. The system constantly regulates x-ray tube current as the image converter is scanned over regions of the body which have different X-ray transparencies.

We claim:

1. An x-ray image intensifier system with automatic brightness control comprising:

a. An x-ray image intensifier adapted to convert an x-ray image to an optical image;

b. an x-ray tube including an anode and an electron emissive filament, said tube being located to project x-radiation through a subject to create an image that is intercepted by the intensifier;

c. a source of AC electric power;

d. an electric power control means connected in a circuit with said source of AC power and said filament;

a video camera located to receive the optical image from said intensifier and adapted to produce video signals representative of brightness variations in the optical image;

f. a video signal peak detector means adapted to select video signal peaks above a certain amplitude, said peak detector means including a diode means through which said selected video voltage signals are conducted and a first capacitor which is connected to the diode means for being charged to substantially the voltage level of the peak video signals that correspond with a peak brightness region in the optical image;

g. a reference voltage source and means comparing said peak voltage on said capacitor with the voltage of said reference source to thereby produce an error signal; and h. means responsive to said error signal controlling the electric power control means to adjust the x-ray tube filament current and reduce the error signal.

2. The invention set forth in claim 1 including:

a. means responsive to horizontal and vertical synchronizing pulses from said video camera for producing delayed horizontal and vertical gate pulses of predetermined duration following occurrence of each synchronizing pulse;

b. means adapted to receive and add said delayed pulses and produce an output gate pulse having a duration corresponding with the video camera scanning a predetermined window area of said optical image; and c. a semiconductor switch means connected to conduct said video signals to said peak detector and adapted to be turned on by said output gate pulses whereby to permit detection of peak video signals only when said window area is being scanned.

3. The invention set forth in claim 1 wherein the means that are responsive to the error signal include:

a. transistor means connected to receive said error signal and being variably conductive in dependence on the amplitude of the error signal;

b. a DC source;

c. a second capacitor;

d. a first charging circuit for said second capacitor including a resistor connected between one side of the DC source and a terminal of the transistor means and a diode connected from said terminal to said second capacitor;

e. a second charging circuit for said second capacitor comprising a resistor connected thereto and to the one side of the DC source:

f. A unijunction transistor oscillator means having base terminals and an emitter terminal, the latter being connected to said capacitor, and adapted to render the unijunction transistor conductive normally when the capacitor is charged to the triggering level of the unijunction transistor;

g. Means supplying pulses that are synchronized with each half-cycle of the AC power line to the base terminals of the unijunction transistor whereby to permit discharge of any residual charge on the second capacitor between synchronizing pulses after the unijunction is triggered;

h. Variations in the conductivity of said transistor means due to said error signal varying the charging time of said second capacitor and causing the triggering time to said unijunction transistor and the output pulses therefrom to occur earlier or later during consecutive half-cycles;

i. A controlled rectifier having an anode, a cathode, and a gate electrode;

j. A full-wave bridge rectifier;

k. a filament transformer and an AC power transformer in a circuit with the bridge rectifier and the anode and cathode of the controlled rectifier; and l. the output pulses of said unijunction transistor being applied to the gate terminal of the controlled rectifier to control its conduction angle and thereby control the power to the filament transformer depending on the time at which the unijunction pulses occur during each half-cycle.

4. The invention set forth in claim 3 including:

a. a resistor in parallel with said first capacitor and having an RC time constant substantially equal to two half-cycles of the AC power source, whereby the detected peak video signal voltage will be maintained long enough for two consecutive unijunction output pulses to occur at substantially the same time in any two consecutive half-cycle periods.

5. The invention set forth in claim 1 including:

a. a resistor in series between said diode and said first capacitor in said peak detector means; and b. a normally closed switch shunting said resistor, opening of said switch causing voltage on said first capacitor to be below the peak signal value whereby to increase the error signal and the current through the filament of the x-ray tube.

6. An x-ray image intensifier with automatic brightness control comprising:

a. an x-ray image intensifier adapted to convert an x-ray image to an optical image;

b. a video camera means located to receive the optical image from the image intensifier and adapted to produce video signals representative of brightness variations in the image;

c. a television monitor that is driven by the video signals and displays the image;

d. an x-ray tube having a filament whose input power controls the intensity of the x-rays from the tube that are projected through a subject to the intensifier;

e. an AC power circuit supplying said filament;

f. a controlled rectifier having an anode, a cathode, and a gate electrode, the anode and cathode being in the AC power circuit of the filament and the conduction angle thereof governing the power to the filament;

g. means producing gating signals which occur at a time during each half AC cycle that depends on the peak brightness in a predetermined window area of the optical image, said gating signals being applied to said gate electrode to thereby control the conduction angle and the filament power;

h. a video amplifier means having an input terminal receiving the composite signal from the camera means and an output terminal on which only video signals appear;

i. a video signal peak detector and a semiconductor switch connecting the output terminal of the video amplifier to said detector;

j. means producing a gating signal that exists while said video camera is scanning said window area, said gating signal producing means being controlled by horizontal and vertical synchronizing pulses from said video camera means, and said gating signal turning on said semiconductor switch;

k. said video signal peak detector comprising a diode supplied through the semiconductor switch, a capacitor in series therewith and a resistor in parallel therewith, the time constant of the resistor and capacitor being substantially equal to two half-cycles of said AC source;

l. a source of reference voltage and means comprising the peak video signal on the capacitor with the reference voltage and producing an error voltage; and m. said error voltage controlling the means that produces the gating signals that are applied to the gate electrode of the controlled rectifier to thereby control its conduction angle and power to the filament.